United States Patent [19]
Halpern

[11] Patent Number: 5,960,410
[45] Date of Patent: Sep. 28, 1999

[54] DEVICE AND METHOD FOR OBJECT-BASED DEVELOPMENT OF BUSINESS APPLICATIONS SOFTWARE

[76] Inventor: Mordechai Halpern, 8 Lanthorn Rd., Northborough, Mass. 01532

[21] Appl. No.: 08/761,507

[22] Filed: Dec. 6, 1996

Related U.S. Application Data

[60] Provisional application No. 60/009,126, Dec. 8, 1995.

[51] Int. Cl.$^6$ ..................................................... G60F 17/60
[52] U.S. Cl. ................................................. 705/21; 705/22
[58] Field of Search .................................... 705/2, 22, 33, 705/42, 21; 395/680, 701, 702, 182.02, 182.03, 182.04

[56] References Cited

U.S. PATENT DOCUMENTS

| | | | |
|---|---|---|---|
| 5,257,369 | 10/1993 | Skeen et al. | 395/680 |
| 5,386,568 | 1/1995 | Wold et al. | 395/700 |
| 5,457,797 | 10/1995 | Butterworth et al. | 395/650 |
| 5,568,645 | 10/1996 | Morris et al. | 395/800 |
| 5,826,086 | 10/1998 | Arima et al. | 395/701 |

OTHER PUBLICATIONS

New Software Data ommunications; McGraw–Hill Publications; Dialogue: File 624, Acct# 0010424; p. 267; vol. 15, No. 1, Jan. 1986.

Adlersparte; Adlersparre Introduces"Dynamic Memory Control" Software for DOS PCs; Dialogue: File 621, Acct# 00307393, Aug. 1991.

*Primary Examiner*—Allen R. MacDonald
*Assistant Examiner*—Romain Jeanty
*Attorney, Agent, or Firm*—Bromberg & Sunstein LLP

[57] ABSTRACT

A device and method for developing software for managing a business process. The steps of the method include (a) providing a plurality of business server objects associated with a database and a set of service functions, (b) providing a plurality of client interfaces which include a set of screens for collecting and displaying transaction data, (c) constructing a dynamic mapping between client interfaces. Step (c) further includes the steps of selecting a client interface, selecting a transaction to be implemented with the client interface, specifying a series of stages to implement the transaction resulting in a dynamic map of the transaction and translating the dynamic map into code. The device includes a first memory area for storing business server objects, a second memory area for storing client interfaces and an arrangement which provides a mechanism for selecting a client interface, a mechanism for selecting the transaction which uses the selected client interface, a mechanism for specifying a series of stages to implement a dynamic map of the transaction, and a code generator for translating the dynamic map into code.

16 Claims, 17 Drawing Sheets

DEVICE AND METHOD FOR OBJECT-BASED DEVELOPMENT OF BUSINESS APPLICATIONS SOFTWARE

The present application claims priority from provisional application Ser. No. 60/009,126, filed Dec. 8, 1995, which application is hereby incorporated herein by reference.

FIELD OF INVENTION

The present invention relates to object based software development platforms, and in particular to the automated construction of integrated business software systems from pre-fabricated components.

SUMMARY OF INVENTION

The present invention provides in a preferred embodiment a method for developing a software system for managing a business process. The method of this embodiment includes (a) providing a plurality of business server objects, each business server object being associated with a database and a set of service functions; (b) providing a plurality of client interfaces, each client interface including a set of screens for collecting and displaying transaction data to support the conduct of transactions; and (c) constructing a dynamic mapping between client interfaces, on the one hand, and business server objects, on the other hand, in order to implement a business transaction. The step of constructing a dynamic mapping includes (1) selecting a client interface; (2) selecting the transaction to be implemented using the selected client interface; (3) specifying a series of stages to implement the transaction to result in a dynamic map of the transaction; and (4) translating the dynamic map into code.

In a further embodiment, the specifying of a series of stages is accomplished by graphic means; moreover, each stage has at least one of (i) a member service function of a business server object and (ii) an exit. The step of specifying the series of stages includes specifying, for each stage after a start stage, a formula, using predecessor stage parameters, to assign values to current stage parameters. The step of specifying the formula includes displaying all parameters available at such stage for possible inclusion in the formula. The step of specifying the series of stages also includes specifying the conditions under which each stage will be performed; the step of specifying these conditions similarly includes displaying all parameters available at such stage for use in specifying the conditions.

Related devices are also provided.

BRIEF DESCRIPTION OF THE DRAWINGS

The foregoing aspects of the invention will be more readily understood by reference to the following description, taken with the accompanying drawings, in which.

DETAILED DESCRIPTION OF SPECIFIC EMBODIMENTS

The present invention provides in a preferred embodiment a sophisticated development and integration platform for business application systems.

The platform comprises of a library of pre-fabricated objects, and tools to integrate them into a cohesive fully operational business application system. Based on application developer's visual input, the platform will generate all the code needed to turn a collection of independent objects to a fully functional business application system.

Figure 1:
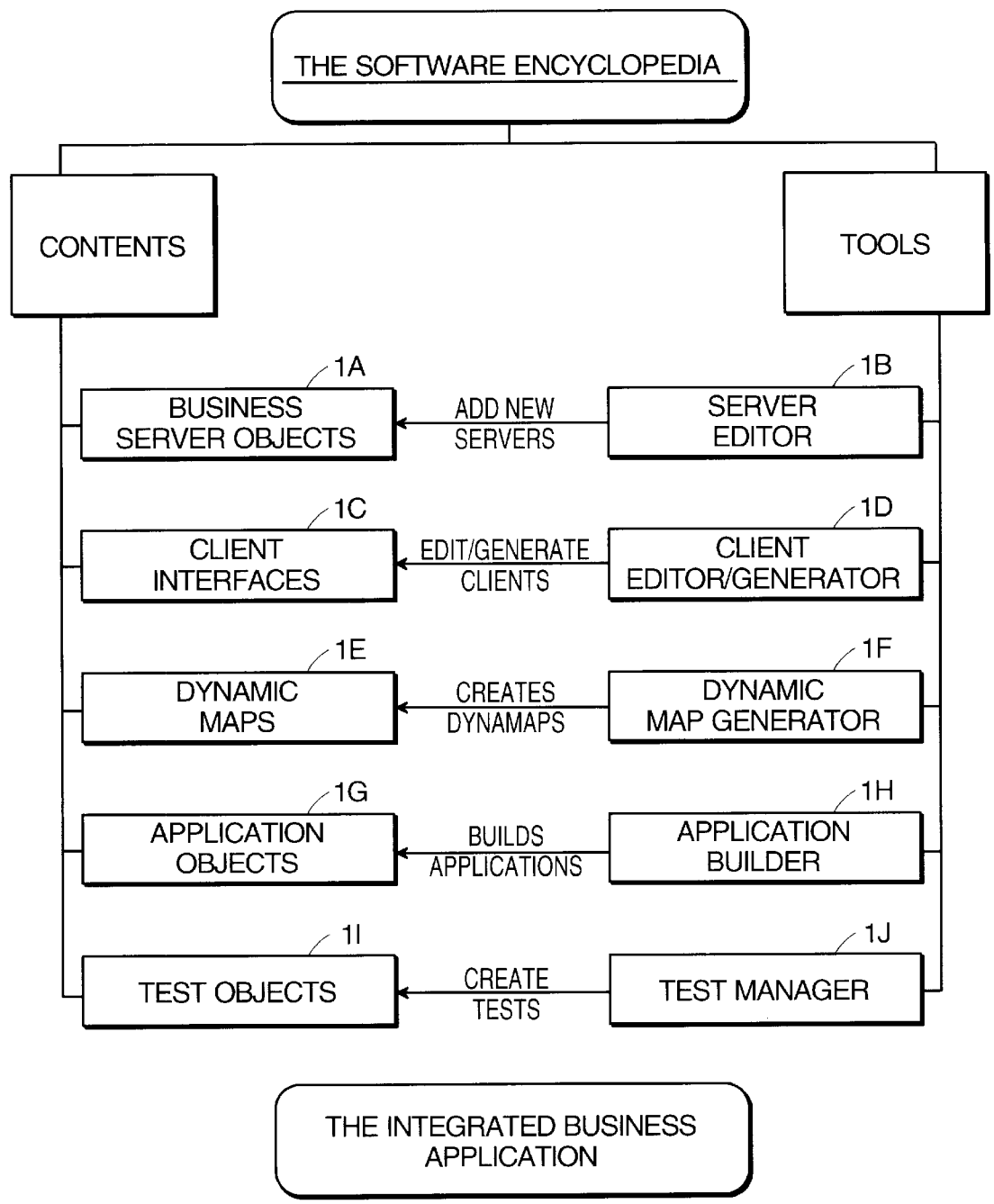
FIG. 1 shows a schematic overview of the development platform.

Platform Components:

The current embodiment of the platform and its components is depicted in FIG. 1.

The first library (1A) contains business server objects. Each Business Server Object represents a well defined business entity, is associated with a database and contains a set of service functions. (examples are: Checking Account Server, Saving Account Server, Customer Server)

The Server Editor (1B) is a platform tool that allows for the registration of new business server objects or for the editing of old business server registration. It has browsing capability and is also capable of automatically creating a tester for the new server object. The registration includes the definition of all Service functions their inputs and outputs and assigning dimension attributes to all quantities. (see below)

The second Library contained in the platform is the Client Interface Library (1C).

Client interface objects typically are objects that provide sets of screens for collecting and displaying transaction data to the business user.

The Client Editor/Generator (1D) is a platform tool that allows for the registration of new Client Interface Objects or for the editing of old Client Interface registration. It has browsing capability and is also capable of automatically creating prototype Clients. The registration includes the definition of all Client screens and Screen data contents, screen flows, all transactions initiated by the client interface, transactions inputs and outputs and assigning dimension attributes to all quantities. (see below)

The Dynamic Mapping objects (1E) provide dynamic mapping between client interface from the one hand and Business server objects on the other hand. They constitute the middle layers. Dynamic maps can also connect to other dynamic maps in a recursive fashion.

In this embodiment a unique dynamic map is created for each Client transaction.

Figure 6:
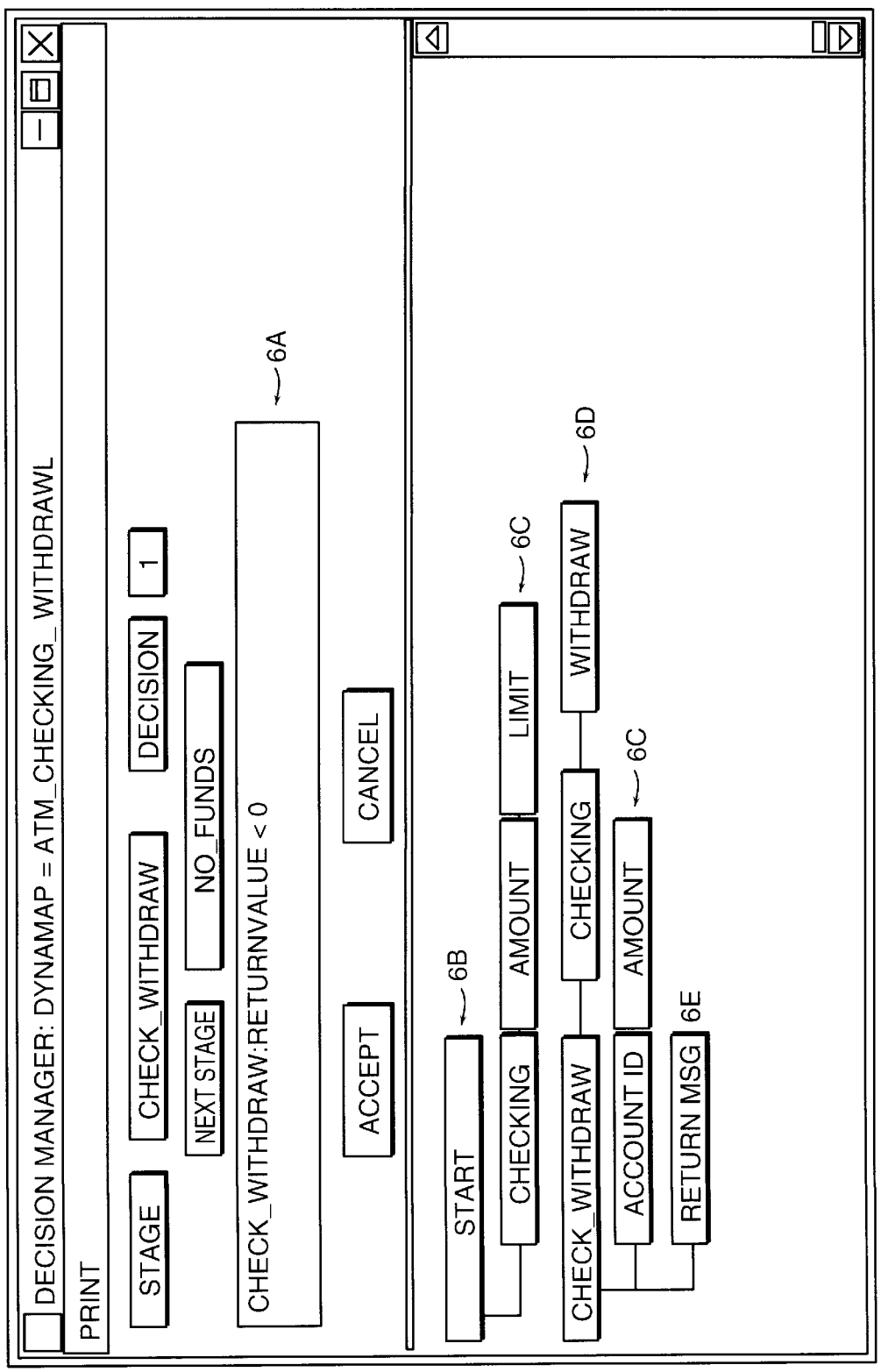
FIG. 6 shows an example of the decision manager screen. It is used to create the decision expression that determines the conditions under which a stage is activated.
Figure 7:
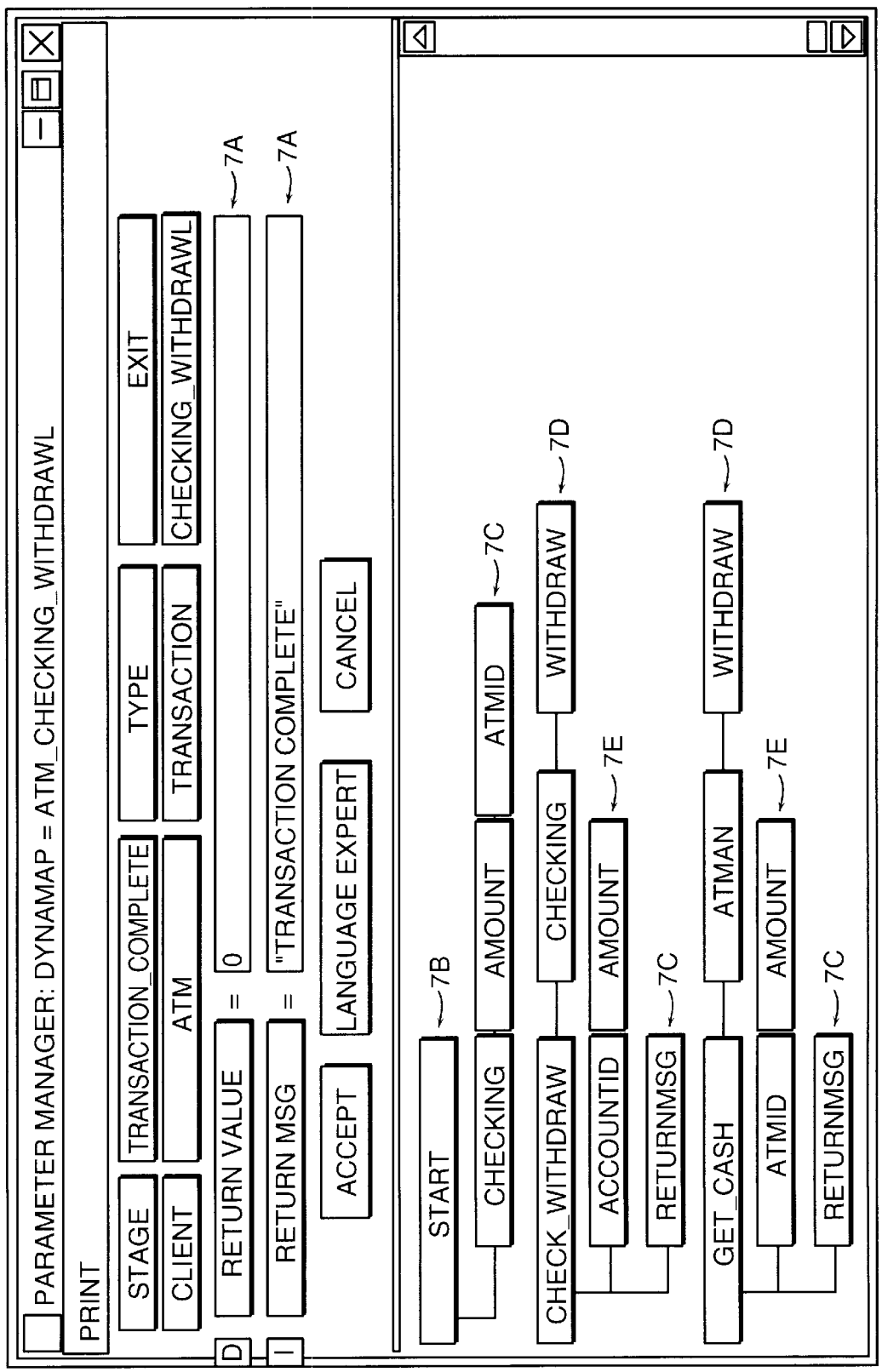
FIG. 7 shows an example of the parameter manager screen. This screen supports the assignment of input data to different business server objects used in the application.
Figure 8:
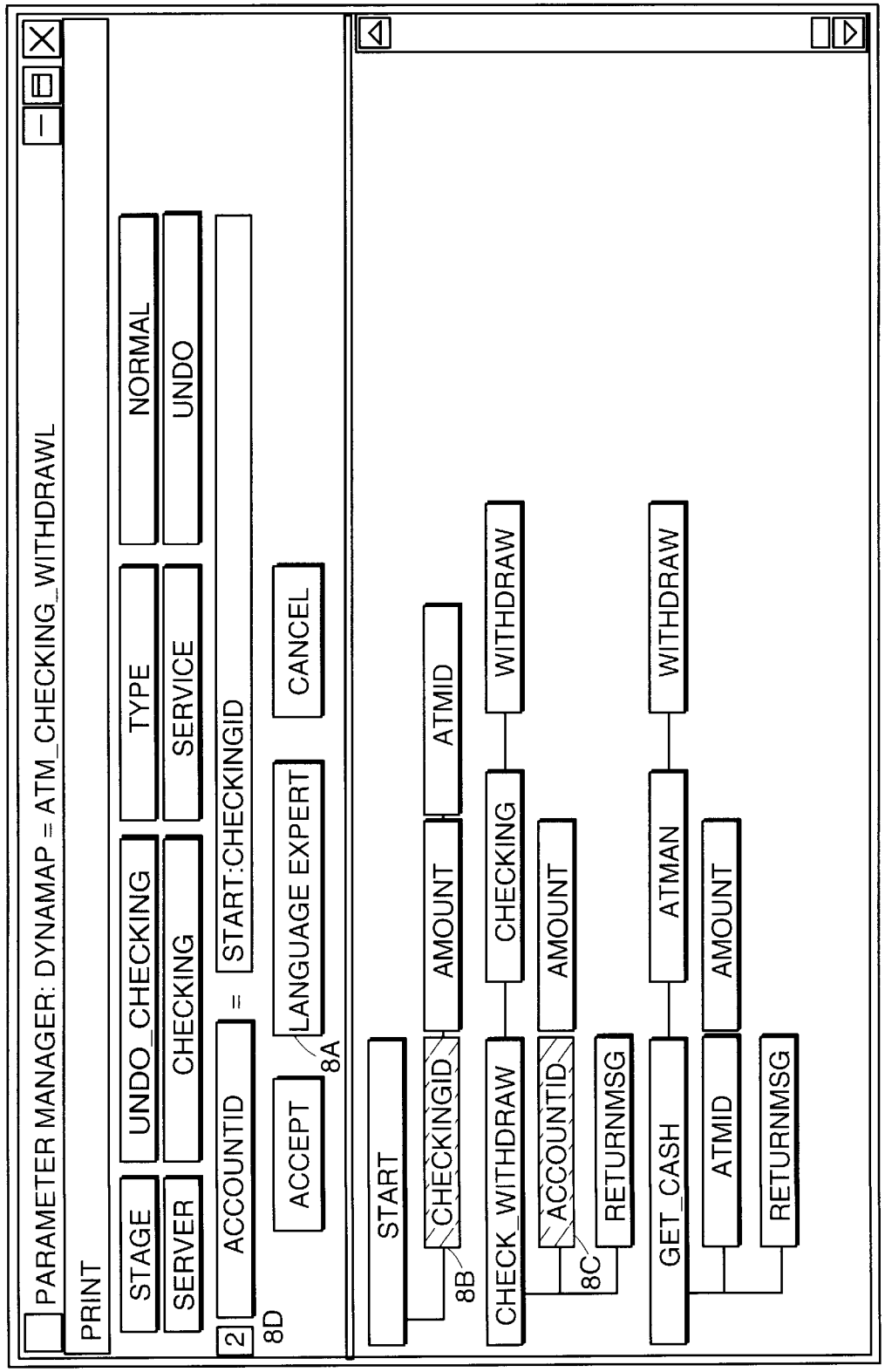
FIG. 8 shows the effect of the use of the Language expert.
Figure 9:
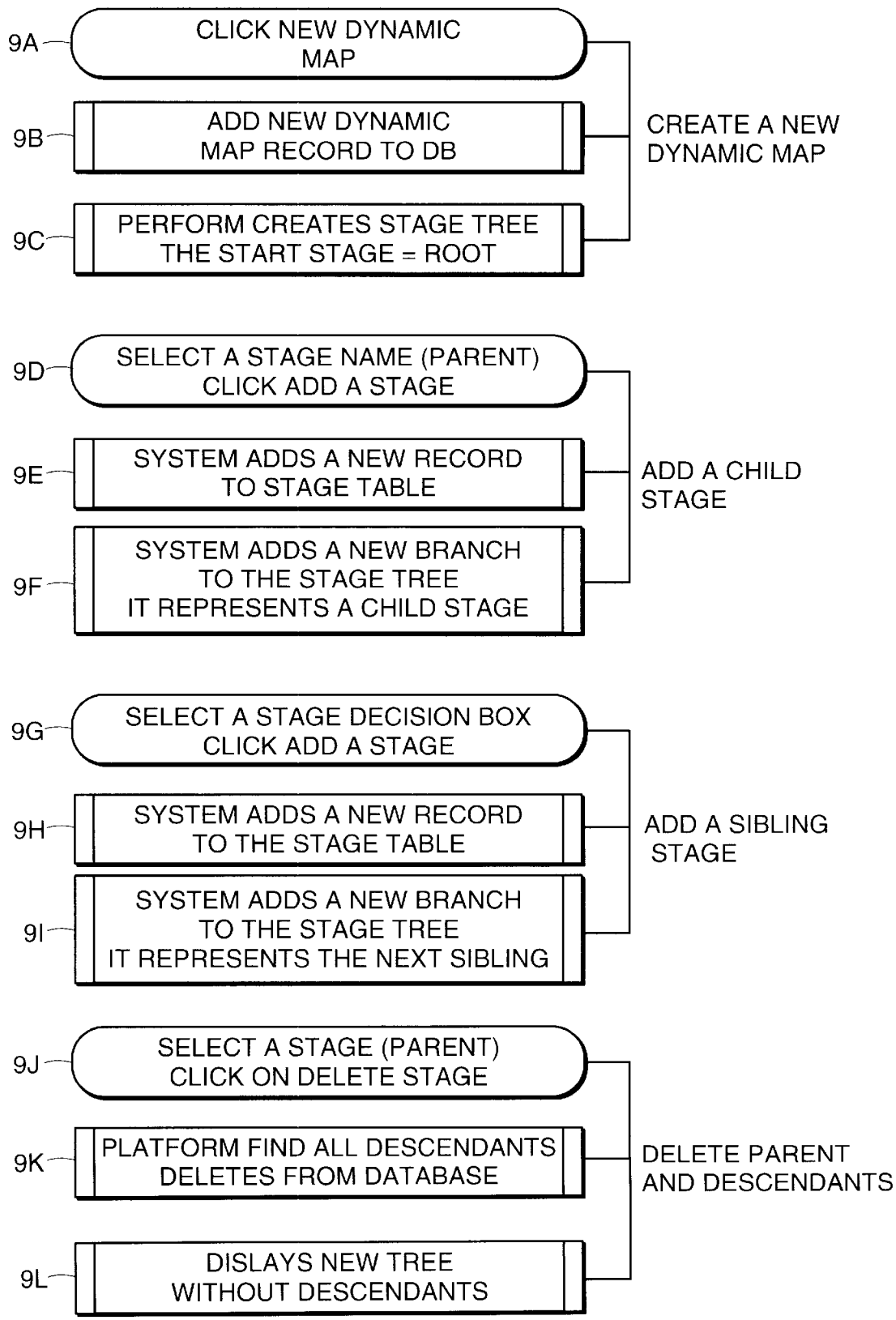
FIG. 9 Shows the flowchart of the Dynamic map stage tree generator
Figure 10:
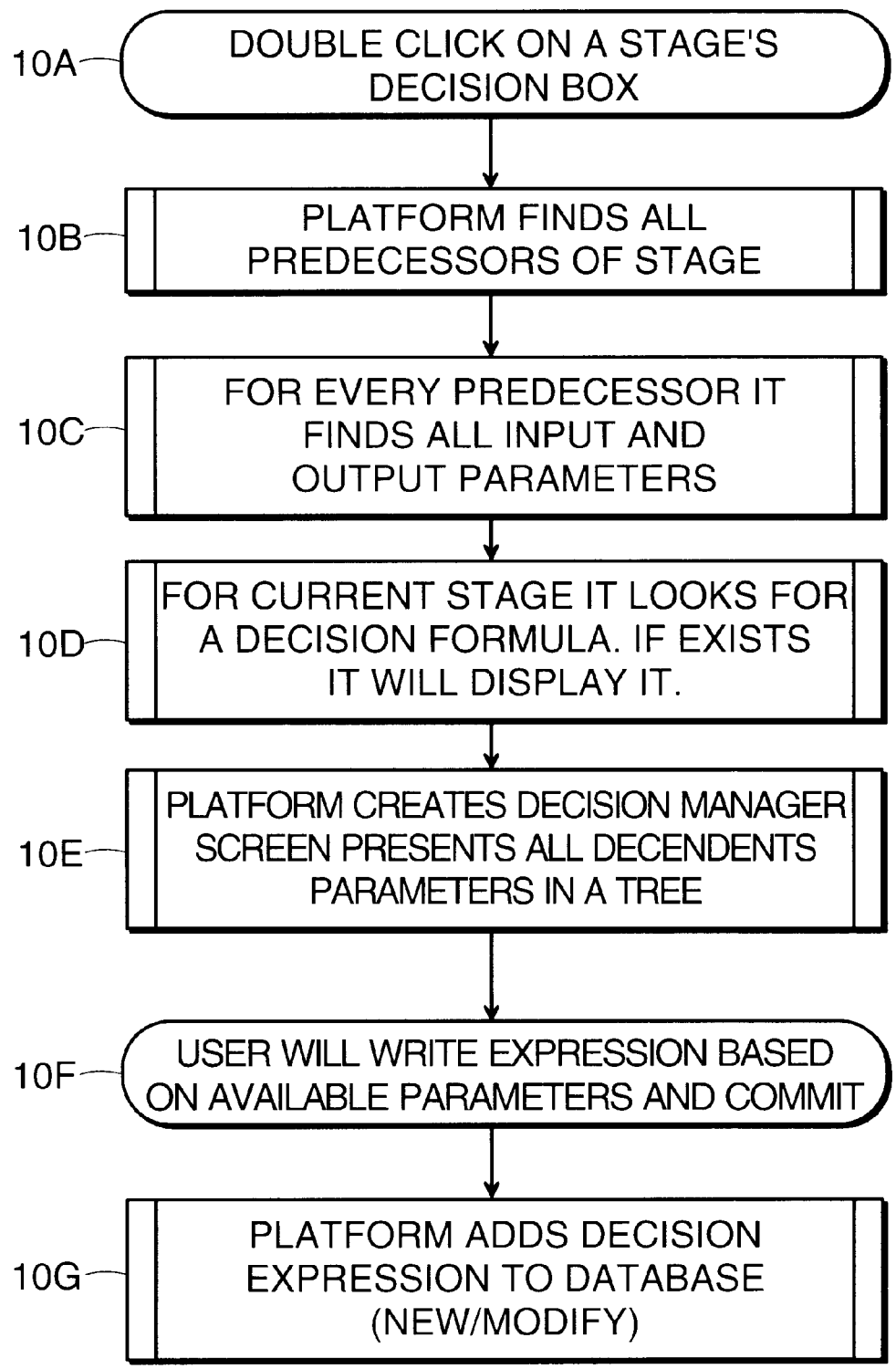
FIG. 10 Shows a flow chart for the decision manager.
Figure 11:
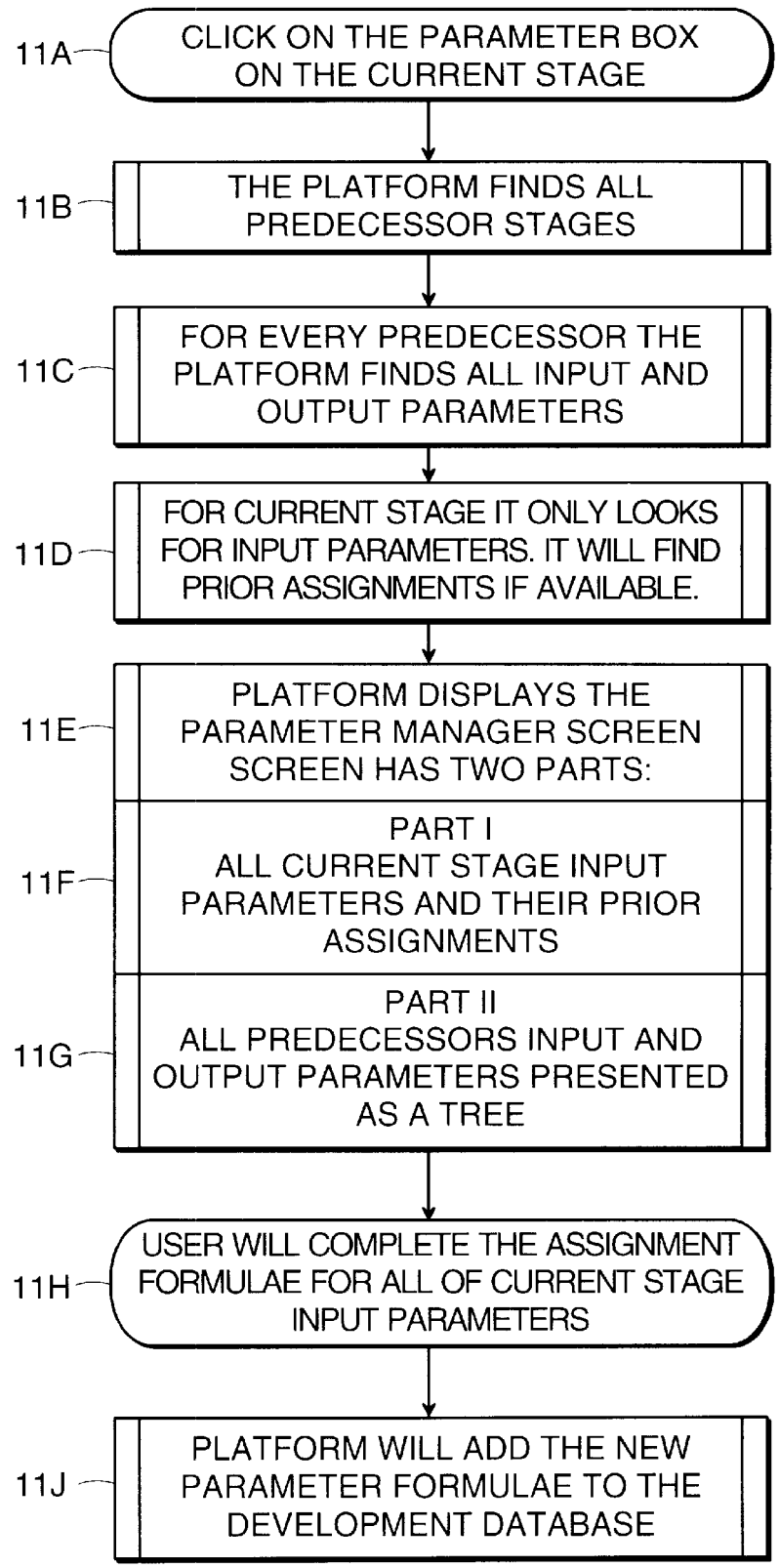
FIG. 11 shows a flowchart for the parameter manager.

The Dynamic Map Generator (1F) is a platform tool that will generate Dynamic Map Objects code from Visual Maps, such as depicted in FIGS. 6,7,8.

An Application Object (1G) is a consistent collection of client interface objects, Dynamic Maps and Business Server Objects to constitute a meaningful Business Application. The platform contains a library of such ready Application objects. They are ready to run. The Application object also contains information about the various hardware the application is distributed on.

The Application builder (1H) in this embodiment is a graphic tool allowing for the creation of application objects. One of its main features is to allow for the dissecting of the applications or consistent portions of them. This allows different members of development team to run different portions of the applications autonomously.

Test Objects (1I), those are attached to specific application objects. They provide test data streams that allow automated testing of the application. They include report definitions.

The Test Editor (1J) is a tool that builds the test objects.

Figure 2:
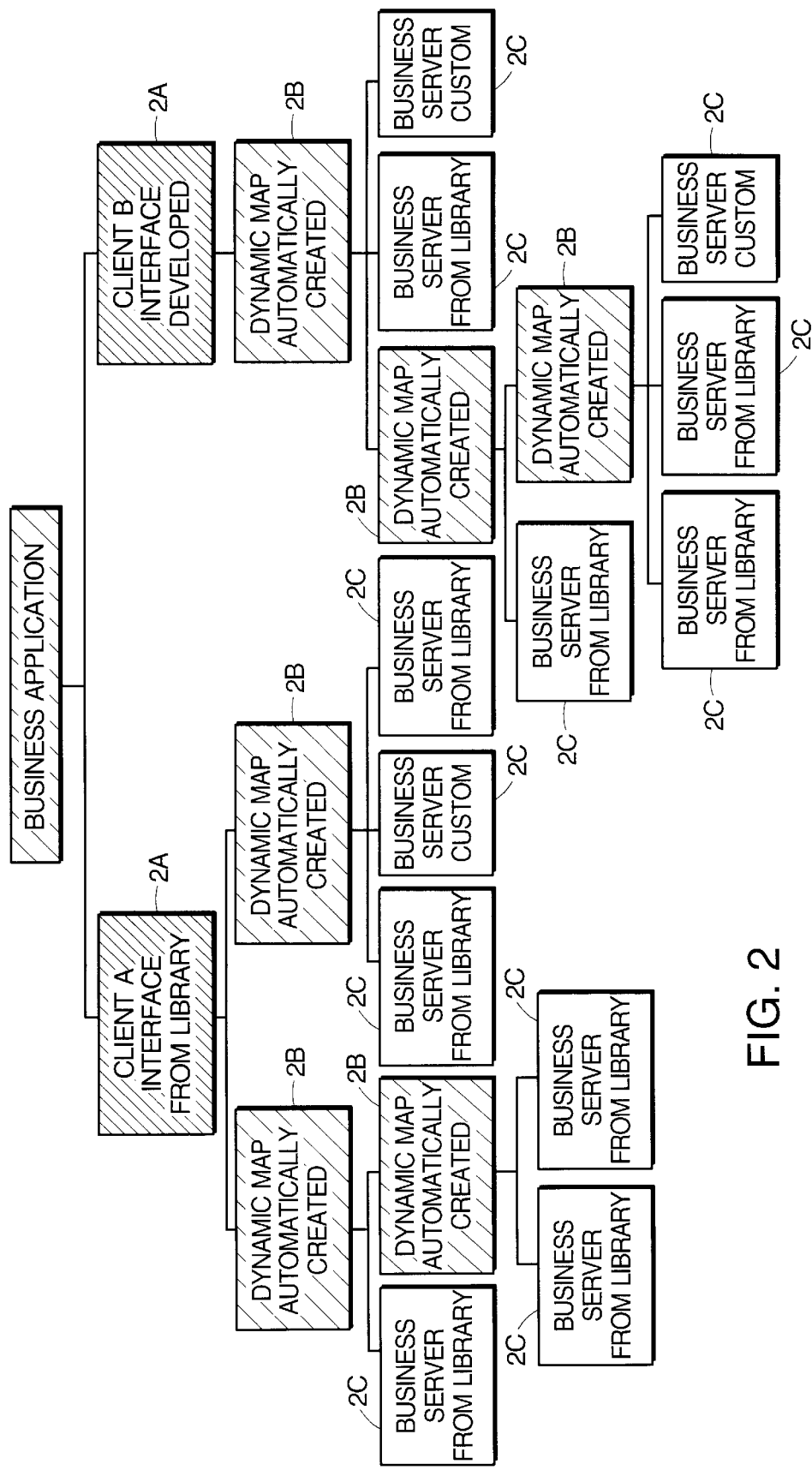
FIG. 2 shows the general structure of a target business system.

The Development Process, the User's Perspective:

A Typical development process using the platform will entail the following steps:

1. Identify organizational units with identical business transaction needs.
2. A Client Object (Program) is developed for each such unit. Use the Client Interface Library with the Client Editor to acquire or manufacture such an object.
3. For each Client transaction identify the Servers you need, using the server editor. Add custom servers if needed.
4. Use the Dynamic Map Generator to create the dynamic mapping objects that bind the clients and the servers.
5. Create An Application Object to run your application
6. Test the Application by supplying test sequences to the Test The Target Business Application, Structure:

The target business application created, comprises of a plurality of components. The overall structure of the target business application system is depicted in FIG. 2.

The Objects can be classified as follows:

Client Interface components (2A); those provide the interface screens for collection and displaying business transaction data. Client Interface components can either be found in the Client Interface Library, assembled from other clients, or constructed automatically by the platform from scratch.

Business server objects (2C); those are associated with a database and a set of service functions. Servers objects represent specific business entities such as a certain type of Savings accounts and its functions. The majority of objects in the Object library are business server objects.

Dynamic Maps (2B); Those objects are the middle layer objects providing a series of bridges (mappings) between client interfaces from the one hand and business server objects on the other hand, in order to implement a business transaction. The dynamic map objects are automatically constructed by the platform.

Figure 3:
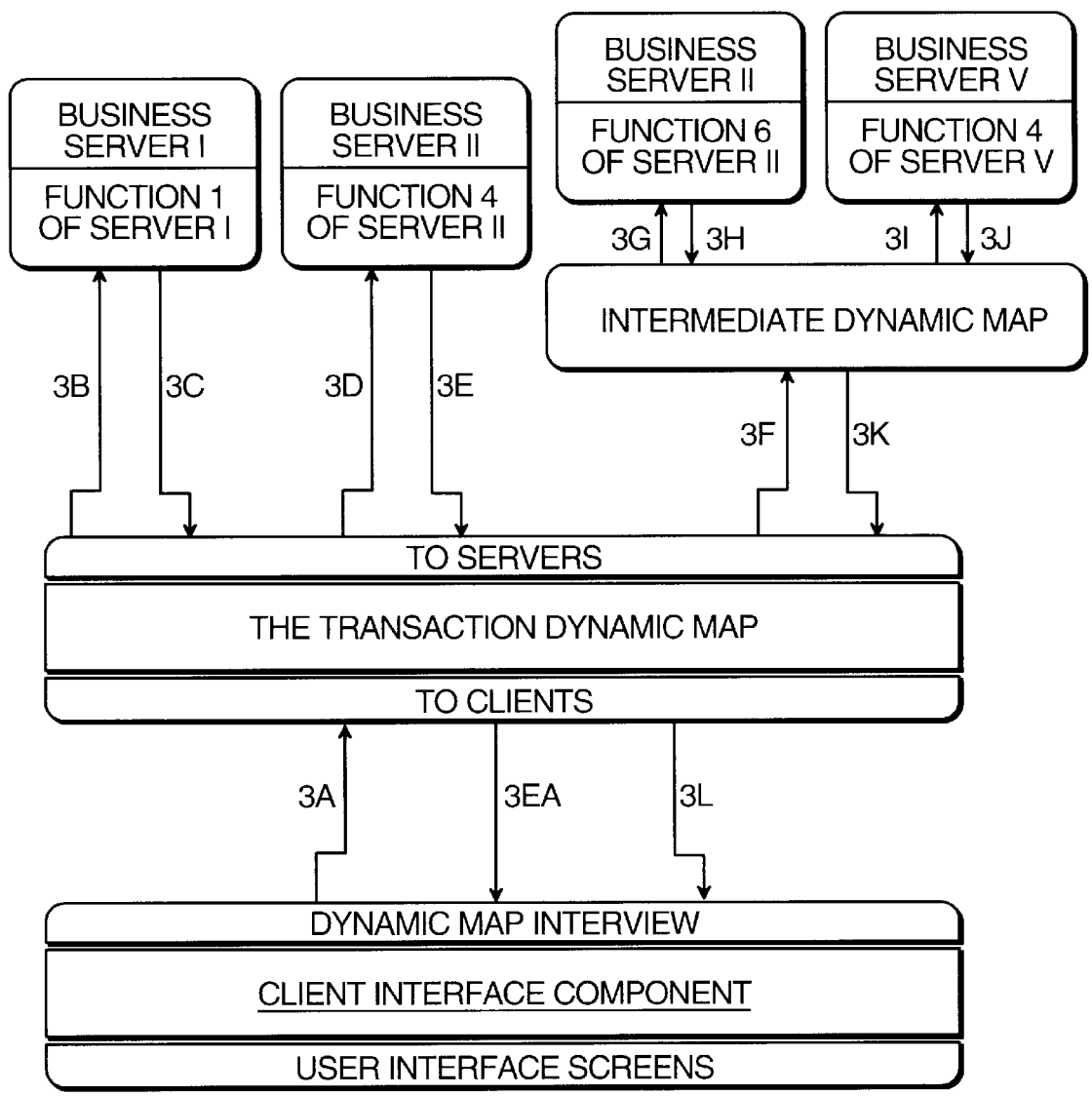
FIG. 3 illustrates an example of a flow for a simple transaction in the target business system.

For an object based system to function each transaction must utilize the services (service functions) of multiple objects. A typical flow of a transaction is depicted in FIG. 3. The platform supports also multiple routings for a transaction. A different portion of a route may be chosen depending on the value of some calculated expressions. For example in FIG. 3 the normal route follows 3A–3L, failure in function 4 of server II however will lead to discontinuation of the normal route after 3E and continuing with 3EA to complete the transaction.

The Development Platform:

The development platform software comprises of two main elements; The Visual Development Platform and the Code Generator.

The Visual development platform provides the interface screens for the target application developer. For every application the visual development platform creates the application database in which all data related to the specific application resides. It also can register the application or portions thereof in the object encyclopedia, which contains the main object libraries. The Code generator uses the data in the application's database plus object data from the encyclopedia to create the target application's code. In this embodiment the target application is using the encyclopedia objects via Ole calls. Many other forms such as Corba are supported.

Figure 13:
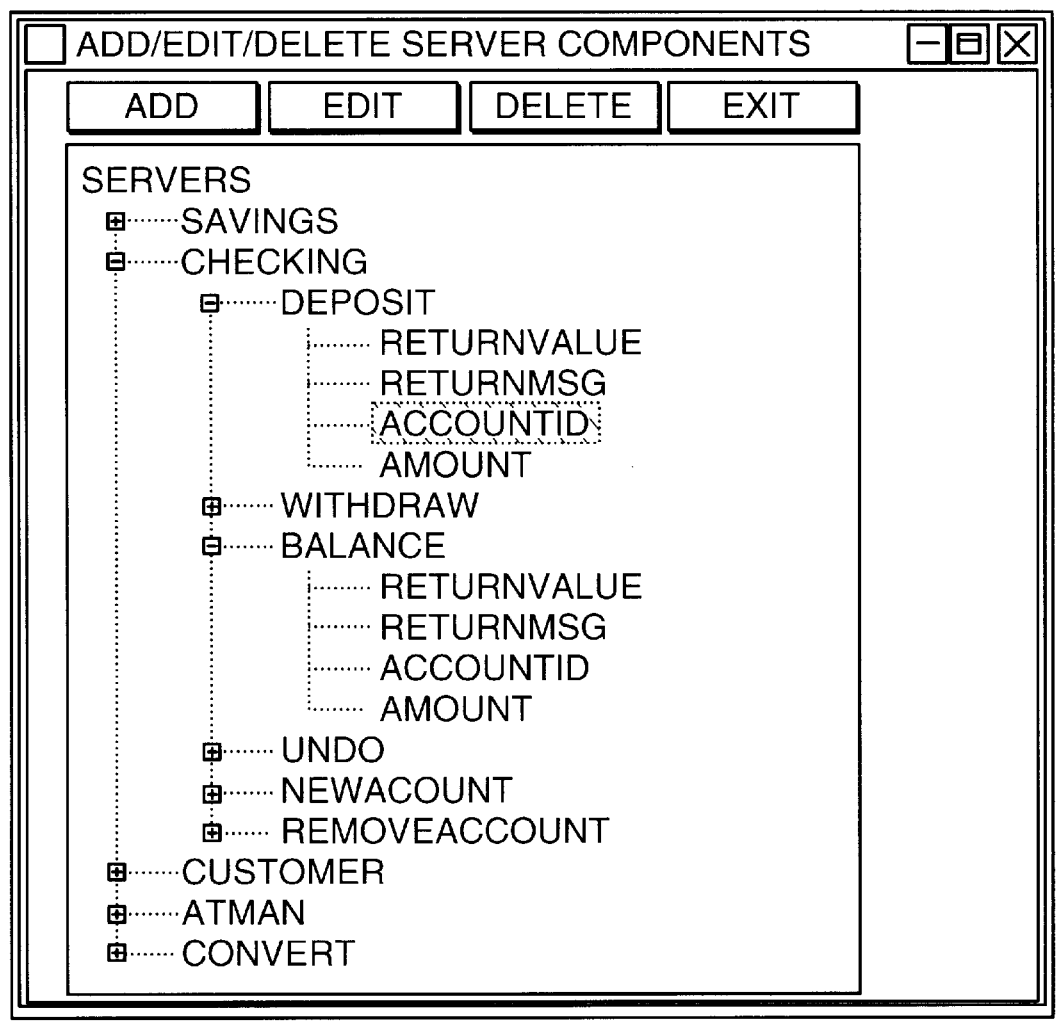
FIG. 13 shows an example of the server editor screen.

In this embodiment, the Encyclopedia's database contains the following main parts Business Server Objects
 All Information on the registered business servers, there service functions and input/output for the functions.
Client Interface Objects
 All Information on the registered client, there service functions and input/output for the functions
Dynamic Map Objects
 Detail allowing the code generator to produce the Dynamic Map. Includes Stages, Service functions called, parameter substitution information and decision expressions for decisions leading to the stage.
Application Objects
 Information needed to run the application, Which objects are part of the application and what are the platforms the application is to be distributed on.
Test Objects
 Test Sequences per application Tools:

This visual development platform is an event based program supplying the following tools:

1. The Server Registrar/Editor:
 This module registers new business server objects or modify old ones in the object encyclopedia. The related screen is depicted in FIG. 13.
The registration process involves definition of:
 1.1 Server name and attributes (First level FIG. 13)
 1.2 Service functions names (Second Level FIG. 13)
 1.3 Service function parameters names and all attributes (Third Level FIG. 13)
 1.4 List of return Values and related return Messages (Fourth Level FIG. 13)
 The server registrar can also perform the following functions:
 1.5 Automatically Create a tester client for the server object
 1.6 Activate the tester.

Figure 14:
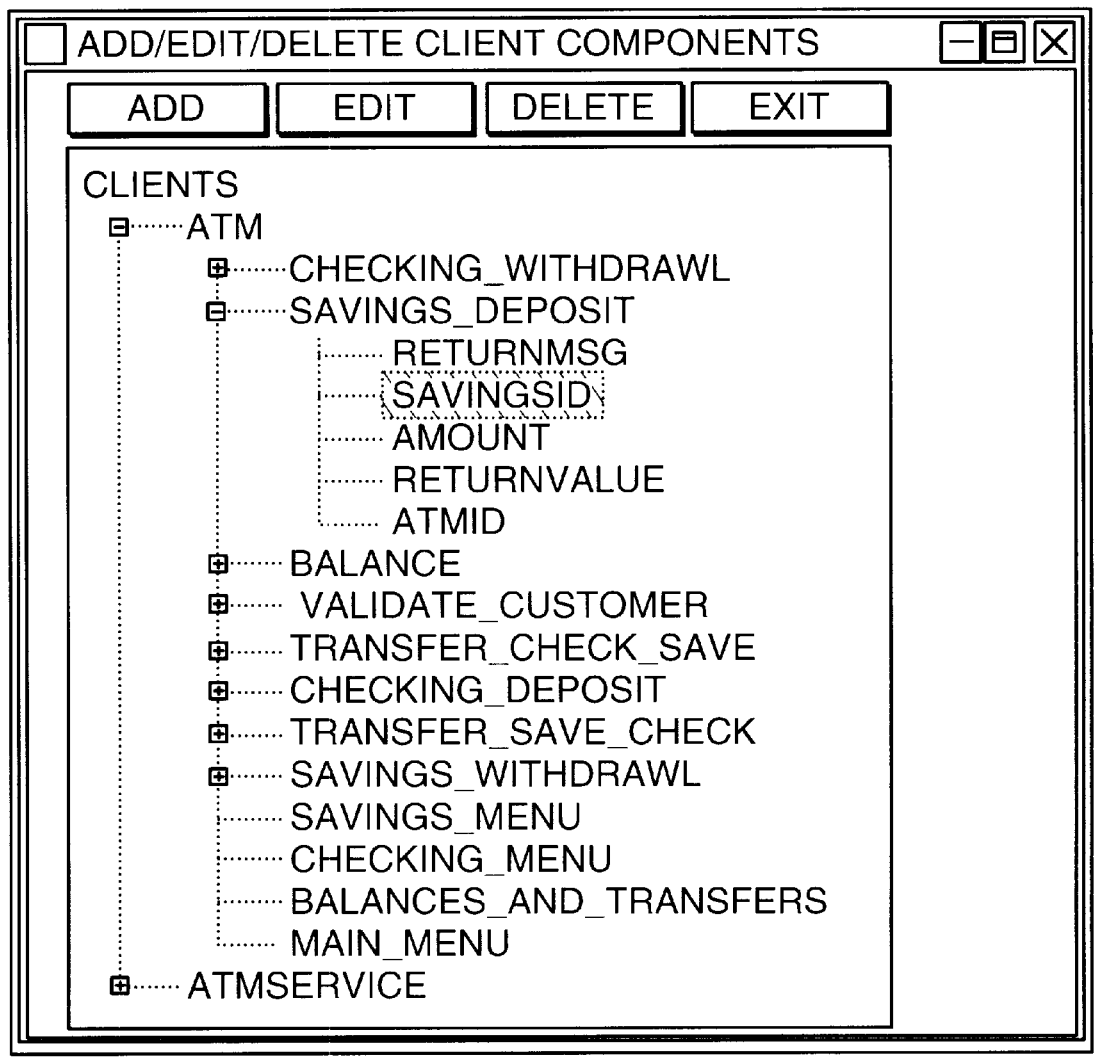
FIG. 14 shown an example of the client editor screen.
Figure 15:
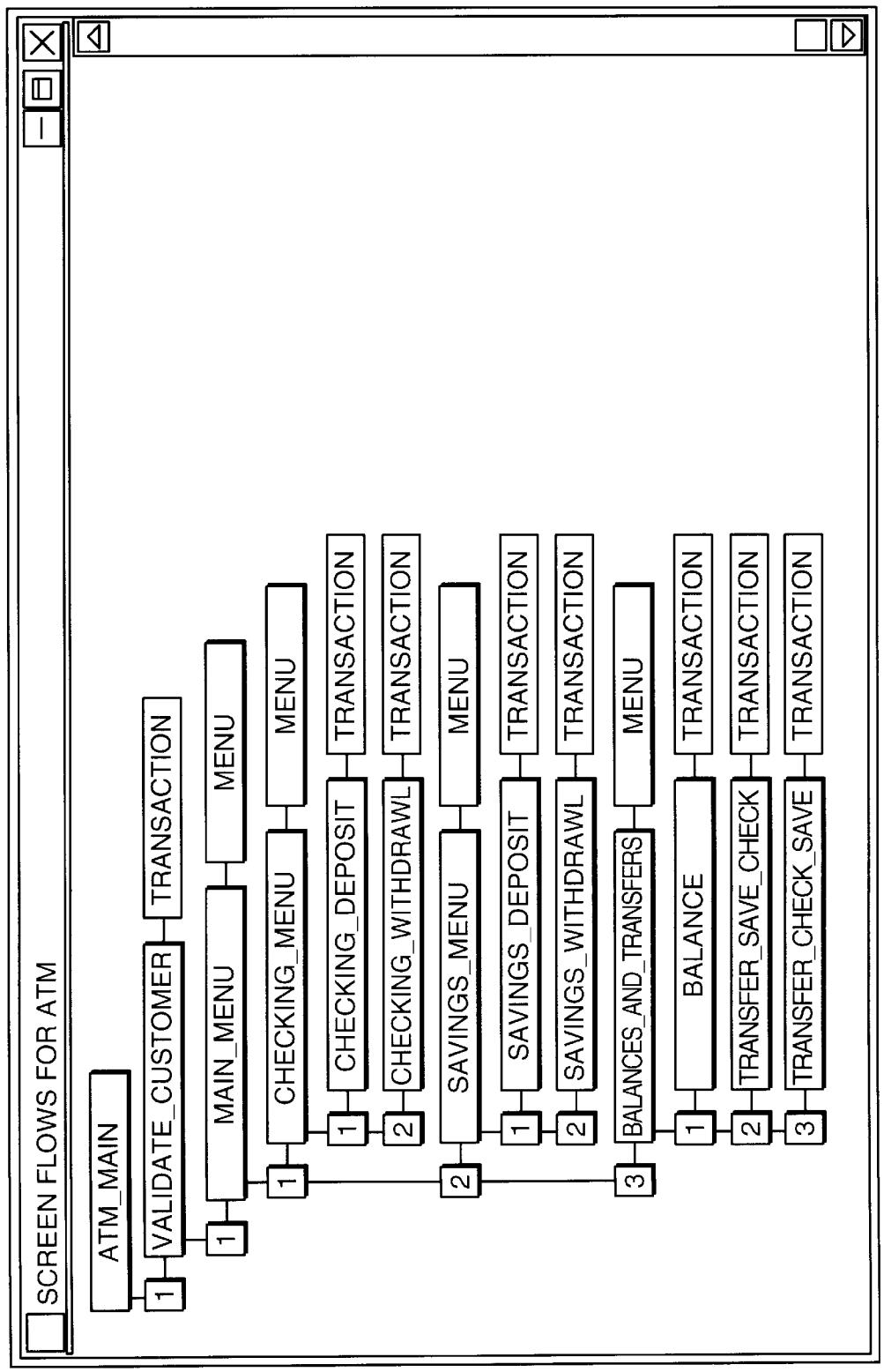
FIG. 15 shows an example of the screen flows for a client.

The main entities, in this embodiment, of the business server database are:
 1.A Server Table:
  Server name, executable path, and description
 1.B Service Functions Table:
  Service name and descriptions, (Those are the object's methods)
 1.C Service Function Parameter Tables:
  Input/Output Parameters for each service function, data type, Usage (Input Or Output), and Meaning attributes 1.D Return Values Table:
   Contain return values and related return messages for each service function 2. The client Registrar/editor Module:
   This module registers new Client interface objects in the object encyclopedia. The relevant screens are depicted in FIG. 14 and FIG. 15.
The registration process involves definition of:
   1.1 Client name and attributes (First level FIG. 14)
   1.2 Transaction names and attributes (Second Level FIG. 14)
   1.3 Transaction parameters names and all attributes (Third Level FIG. 14)
   1.4 The flow of screens (FIG. 15). Screen either call a transaction or are simply menus. (in both cases data can be collected and displayed)

Figure 4:
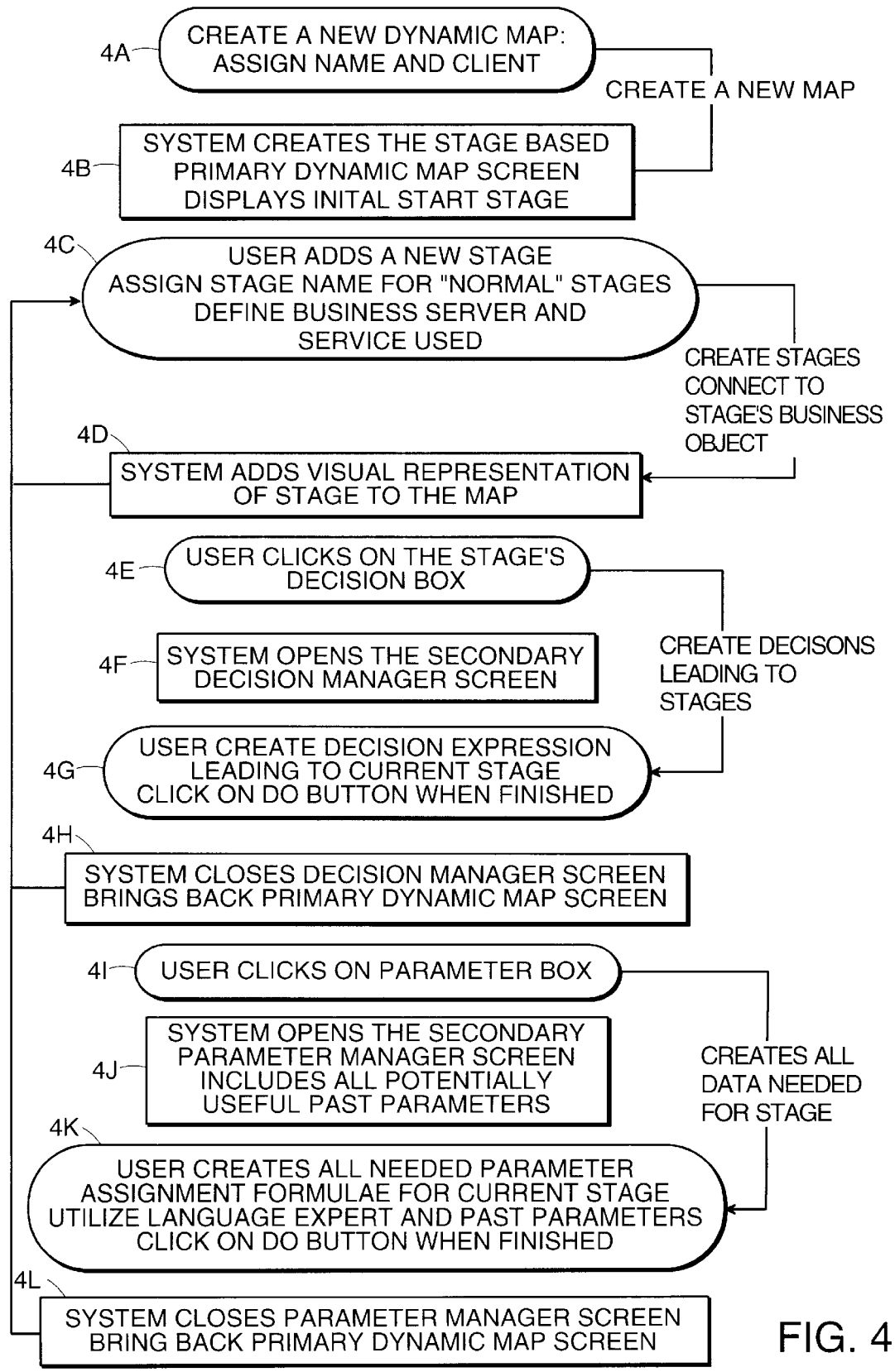
FIG. 4 shows the development process of the middle layer dynamic map.
Figure 5:
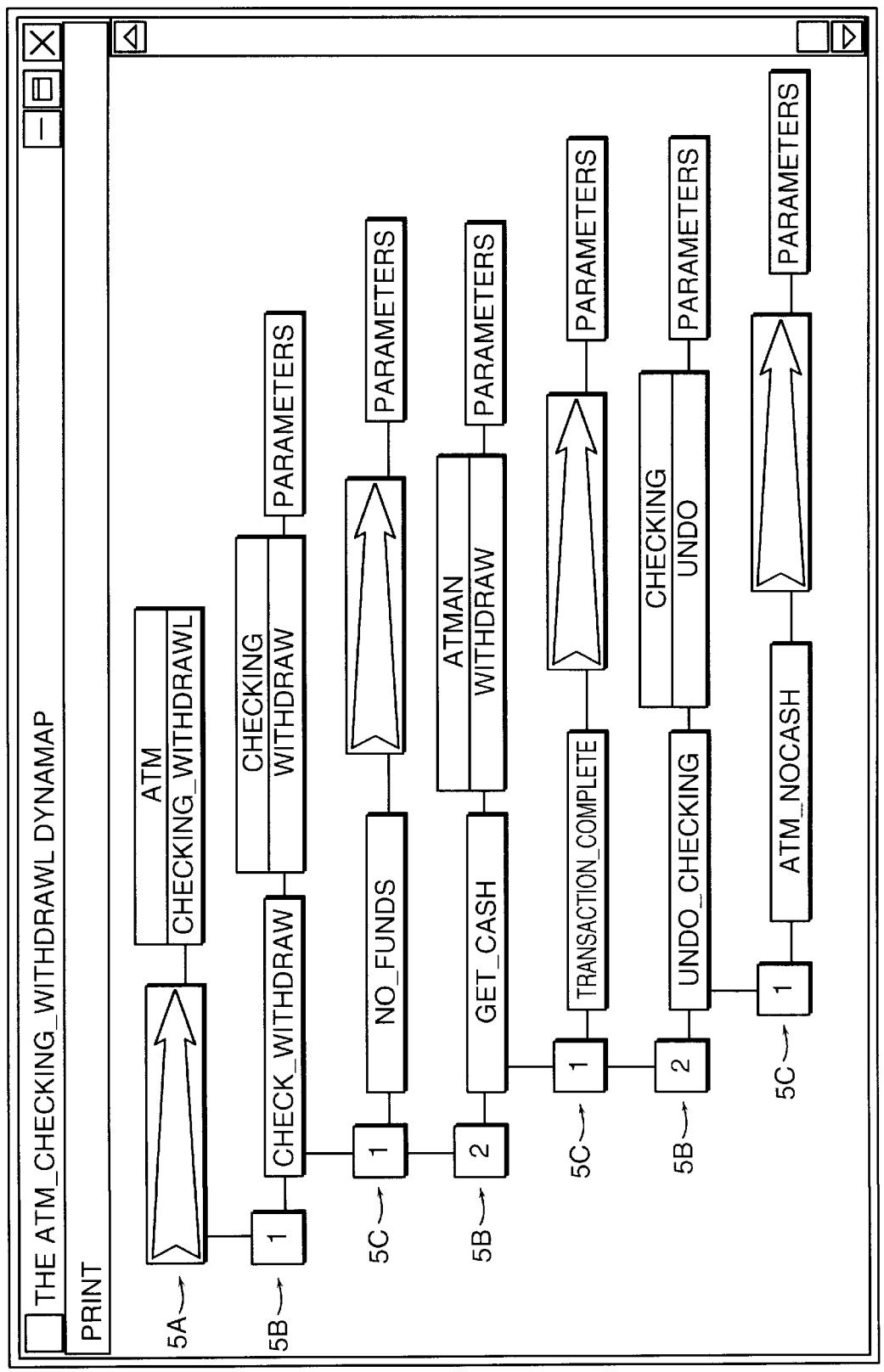
FIG. 5 shows an example of the primary screen that is used to develop the different stages of the dynamic map objects.

The client registrar/editor can perform the additional following functions
   1.5 Automatically create a prototype client
   1.6 test the client screens and flow The main attributes of a client interface database relations are:
   2.A Clients Table:
      Client name, executable path and description
   2.B Transaction Table:
      Transactions supported, names and descriptions
   2.C Transaction Parameters Table:
      Send/Receive Parameters for each Transaction, Type, Usage (Send Or Receive), and Meaning Attributes.
   2.D Screen Flow table, keeping track of the screen activation sequences 3. The Dynamic Maps Generator:
   Once the developer has performed his business analysis and identified the interfaces (clients) and transactions needed to support his business, his main activity will be a stage by stage construction of dynamic maps, utilizing the available library of business server objects and Client Interface Objects. In some cases additional custom business server objects need to be built.
   The platform provides for the automation of the intermediate layers development via the creation of dynamic maps.
   A dynamic map comprises a set of stages. Each stage can be either a "Start Stage" a "Normal Stage" or an "Exit Stage", In this embodiment the stages are organized in a tree structure, (see FIG. 5). FIG. 5 depicts an example of a Dynamic Map. The user can
   3.1 Create A new Dynamic Map
   3.2 Add A New Stage
   3.3 Delete A Stage
   3.4 Edit a Stage
   3.5 Fill in a Decision Formula for a stage
   3.6 Fill in all transmission parameter formulae for a stage
We explain the process of dynamic map construction in some detail.
   The "Start Stage" (5A) represents the entry point to the Dynamic Map.
   The first box in the left represents the standard name of the stage "Start"
   The Second box top is the name of the source client, Bottom name of source transaction serviced (to be called) by the Dynamic map. Alternatively the second box can also represent a calling (source) dynamic map.
The "Exit Stage" (5C) represents the end of the transaction, i.e. a return to the caller.
   The first box from left triggers the decision manager screen (FIG. 6)
   Second box is stage name
   Third box represents that the stage is an "Exit" stage
   Fourth box Triggers parameter manager screen (FIG. 7)
The "Normal Stage" (5B) represents activating a service function.
   The first box from left triggers the decision manager screen (FIG. 6)
   Second box is stage name
   Third box Top represents the Server name, Bottom the service function name, it can also represent another Dynamic Map.
   Fourth box Triggers parameter manager screen (FIG. 7)
   The dynamic map also takes care of supplying all necessary data for the activated function. It also manages of error handling, recovery, and transaction rollback if necessary.
   The role of the developer is to develop the dynamic maps needed stage by stage.
   The development steps involved in the current embodiment are illustrated in FIG. 4. We present them here in some detail;
   Step 4A (User): The user creates a new dynamic map by assigning a name and connecting it to a client (Optional). It also defines all input and output parameters for the new Dynamic map. If a client is defined the parameters will match one of the clients transactions. In this embodiment a dynamic map deals with a single transaction. Each client will use a multiplicity of dynamic maps, at least one per transaction.
   Step 4B (Platform): The platform will open the Primary Dynamic Map Screen (See FIG. 5)
   Only the start stage will exist.
   Step 4C (User): The essence of the development is to add stages. The user now can add a stage by clicking on the parent stage, he picks a type (Exit or Normal) and a name for the new stage. For a "Normal" stage the user may pick server object and a service to be activated. Exit stages require no new server objects.
   Step 4D (Platform): The platform adds the new stage to the Map (FIG. 5)
      After the addition of a few stages the user needs to define;
         The decision conditions under which the stage has to be executed.
         The data or parameters needed for the stage
      This is accomplished in the following steps
   Step 4E (User): Click on the numbered Decision box (Leftmost in FIG. 5), in order to activate the Decision Manager
   Step 4F (Platform): The system presents the Decision Manager Screen. (see FIG. 6) It includes all parameters relevant to the formation of the current stage Decision expression.
   Step 4G(User): For each stage the user must construct the decision expression that will lead to the stage. Formula building is supported by clicking on a past available parameter in order to include it in the formula. Once finished the user commits the decision expression.
   In FIG. 6 the Formula is written into (6A). The available parameters are given in:
      (6C)—Inputs from client or input parameters available from prior stages.
      (6D)—Return Values of prior executed service functions.
      (6E)—Output Parameters available from prior stages.
      Parameters can represent any legitimate structure. (Arrays, User defined structures, Arrays of structures)

Step 4H: The system commits the decision expression to the application database and returns to the primary dynamic map screen.

Step 4I (User): Click on the Parameter box (rightmost in FIG. 5) in order to activate the Parameter manager. (See FIG. 7)

Step 4J (Platform): The Platform displays the Parameter manager screen (FIG. 7).

It includes all parameters relevant to the supply of data for the current stage.

The user/developer must fill in the input values for the current service (7A)

The available parameters are given:
- (7C)—Inputs from client or input parameters available from prior stages.
- (7D)—Return Values of prior executed service functions.
- (6E)—Output Parameters available from prior stages.

Parameters can represent any legitimate structure. (Arrays, User defined structures, Arrays of structures)

Step 4K (User): The user will now build assignment formulae from available data. In a "Normal stage" the formulae will be assigned as input for the stage's service function In the case of an "Exit Stage" the formula will be assigned to the return parameters of the caller. Formula building is supported by clicking on a past available parameter in order to include it in the formula. The user also has an option to use the "Linguistic Expert" by pushing the Language expert button (see FIG. 8). The platform uses to concept of linguistic dimension (see below) in order to highlight all parameters with similar dimensions (8B) and (8C). This assists the user with his formula construction. The platform also creates warnings for any formula assignment that violates the linguistic dimension.

Step 4L (Platform): Once the formula writing is complete the platform returns to the primary screen. The formulae chosen are committed to the application database.

The Dynamic map generator records the dynamic maps in the applications database.

In this embodiment the following entities exist

3.A Dynamic Map table:
  The Dynamic map name, description, client supported, transaction supported.

3.B The Stages Table:
  Stage name, stage type (exit/normal), Server used, service called 3.C The Decisions table:
  Lists next stages for each parent stage, decision expression leading to next stage.

3.D The Parameter Assignment table:
  Parameter name, assignment formula

4. The Linguistic Expert:

When any parameter is introduced to the system it is assigned a linguistic dimension. A linguistic dimension is simply a text type descriptor for any quantity. The user can either use an available linguistic dimension or introduce a new one. As Objects are developed by different people quantities of the same meaning may get different names.

For example a "saving account id" may be called by different developers: "Savings_Id" or "Sid" or "Savings" or simply "S". (There are no rules for variable names except some programming language restrictions). The platform keeps a database of all linguistic dimensions for each variable. All variables with the same linguistic dimension are organized into equivalence sets. In addition the developer may specify superset or subset relationship between all dimensions, the platform keeps a Boolean type graph to store the superset/subset relationship between any two equivalence sets.

In this embodiment the linguistic expert follows the following rules of assignment:
  a) It is allowed to assign a member of the same linguistic dimension.
  b) It is allowed to assign a member of a subset, (A notice to the user is given however)
  c) Warnings are issued for all other cases.

The effect of the system is identical to the "Dimensions" in a formula in Physics Essentially the two sides must have the same dimension. An example of the highlighting action of the linguistic expert is demonstrated in FIG. 8.

5. The Code Generator:

An application consists of Client Interface objects, Business Server Objects and Dynamic Maps. Once all the components are ready the code generator can be activated. It can also be activated selectively to create a consistent sub application. An example for the user screens for the code generator are depicted in FIGS. 16 and 17.

Figure 16:
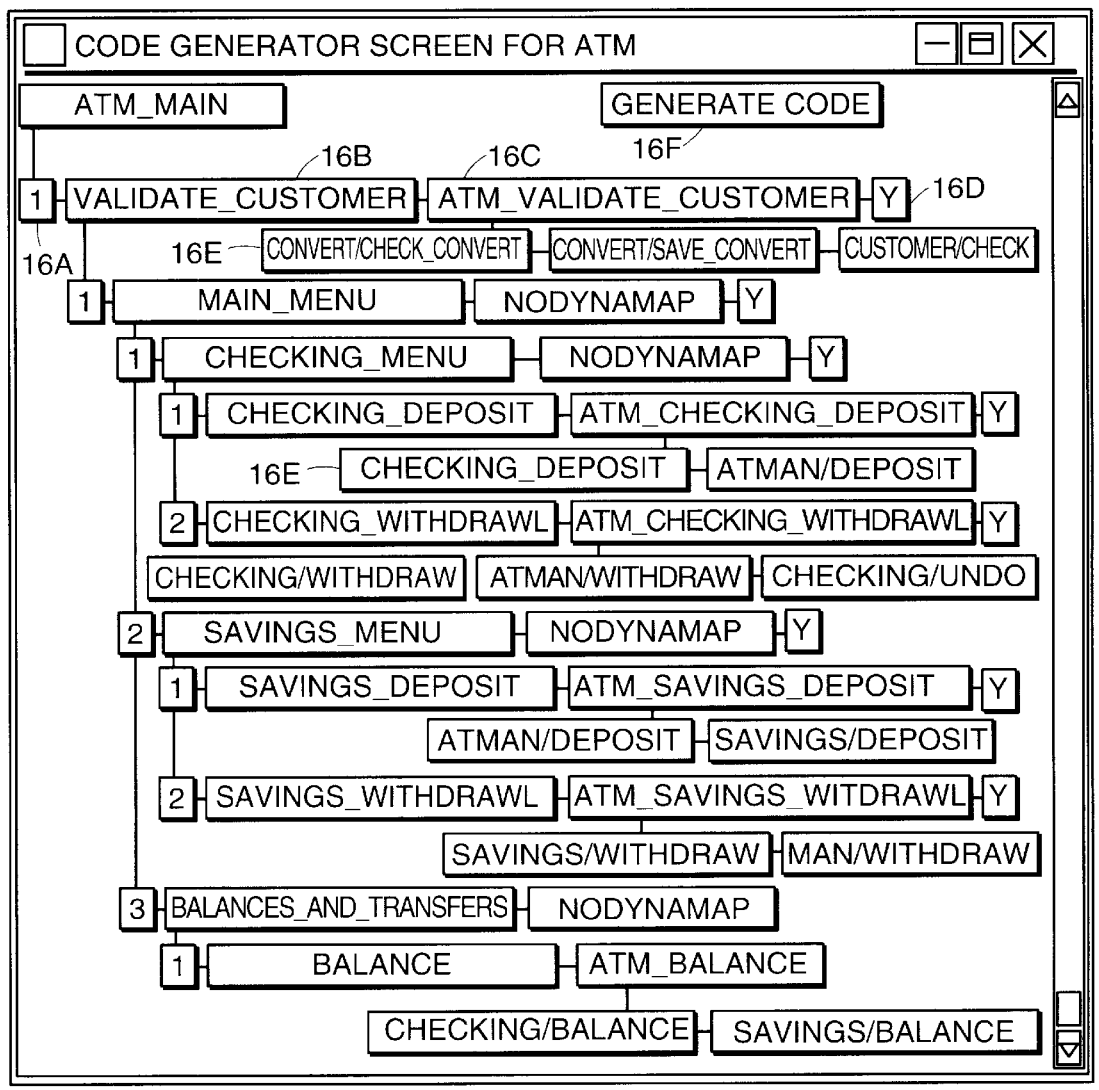
FIG. 16 shows an example of code generator screen.
Figure 17:
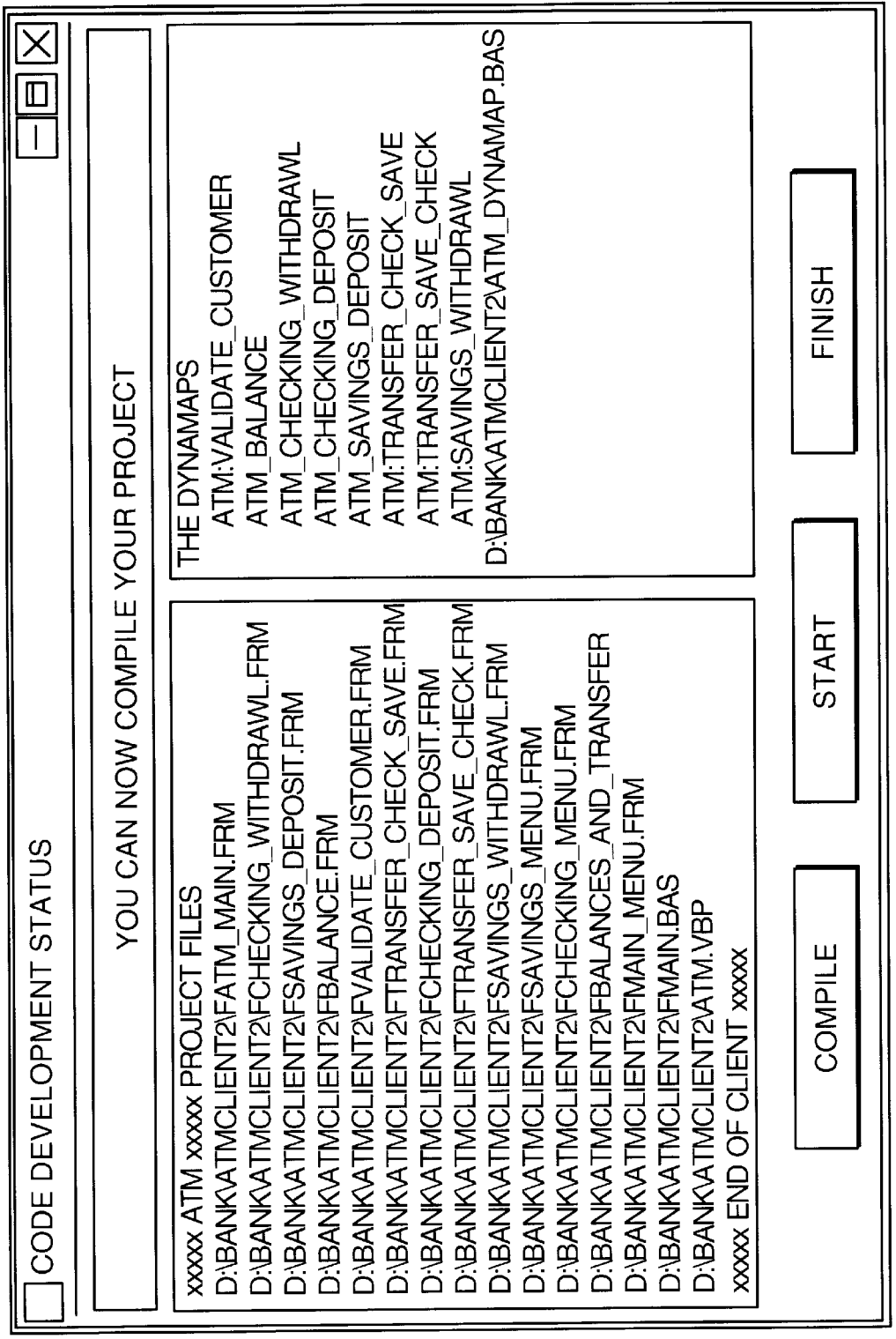
FIG. 17 shows the files generated by the code generator.

FIG. 16 shows the list of all components per client and their relationship.

The client's name appears in the top Caption, it is ATM in this example.

The available transactions are represented in (16B) type blocks

The Available Dynamic maps are represented in (16C) type blocks

The Server/service function called are presented in (14E) type blocks

The user can mark Y (Yes) or N (No) in the (16D) block, Y means generate code, N means ignore. The system keeps the prerequisite consistency of the objects.

Pushing the "Generate Code" button (16F) will generate the code for both dynamic Map and client components. The file generated are displayed in FIG. 17. Options exist to generate only dynamic maps.

The application is now ready to be compiled and run using standard off the shelf language compiles such as VB, VC++ or other. Before code generation the user also specifies the target language. In this embodiment it is Visual Basic version 4.0.

Figure 12:
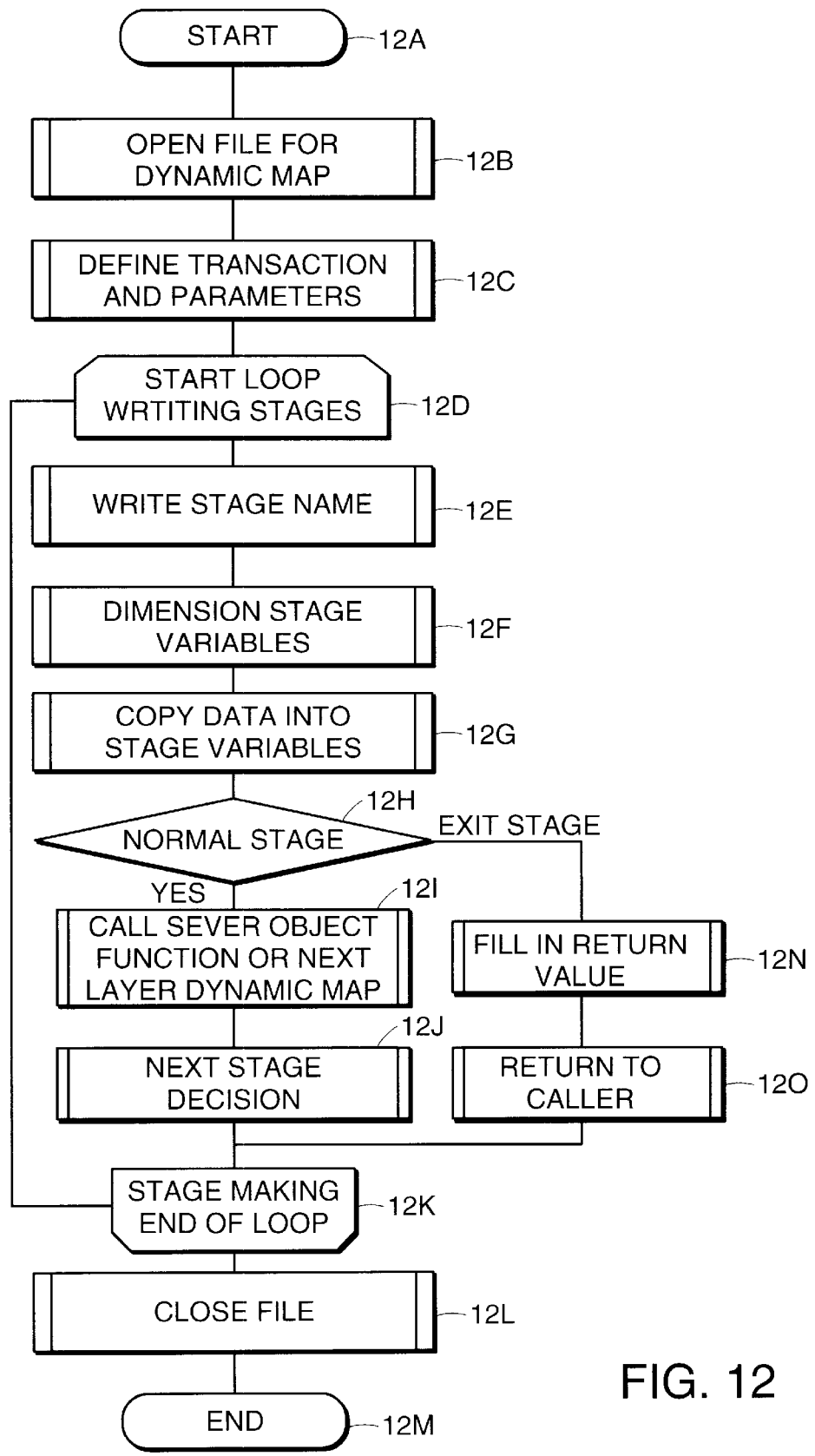
FIG. 12 shows a flowchart of the Dynamic Map code generator.

The make up of the code generator is now described, a flowchart is depicted in FIG. 12.

The method used is to parse each dynamic map stage traversing the stage tree depth first. All data for the creation of code resides in the application database;

There code generator handles the three types of stages previously mentioned, each is handled differently: In addition an initialization stage connects to all objects:

5.1 The Initialization Stage:

In this embodiment OLE technology is used, the initialization will change depending on object technology specified by user.

'Define Object pointers

Option Explicit

Public PxCustomer As Object

Public PxSavings As Object

Public PxATMan As Object

Public PxChecking As Object

Public Function Dyna_Init () As Integer

'Object Creation

```
Set             PxCustomer=CreateObject
    ("CustomerProject.Customer")
Set PxSavings=CreateObject("SavingsProject.Savings")
Set PxATMan=CreateObject("ATManProject.ATMan")
Set             PxChecking=CreateObject
    ("CheckingProject.Checking")
End Function
```
ps 5.2 The "Start" Stage:

In this stage only the function call is generated with the appropriate parameters:

In a Visual Basic embodiment it will look like this (an example) 'Creates Function call

```
'***********************************************
    Public Function ATM_Validate_Customer(Start_ReturnMsg As
Variant,Start_CustomerId As Variant,
Start_Pin As Variant,Start_CheckingId As
Variant,Start_SavingsId As Variant) As Integer
'***********************************************
```

To avoid naming conflict the platform code generator attaches the stage unique name to all the variables, and the client's name to the dynamic map name.

5.3 A "Normal" Stage:

There are a number of parts to the code:
- 5.3.1 The platform writes the name of the stage (Validate in the following example)
- 5.3.2 The platform dimensions all input and output variables and assigns values to them from past stages
- 5.3.3 The code generator creates the call to the service function for this stage: Each stage contains only one service function.
- 5.3.4 The code generator creates the next stage decision based on return values, output values and prior stage inputs or outputs.

An example follows:

```
'Normal stage
'***********************************************
'Stage name
Validate:
'Dimension and assign values to input variables
'Dimension output variables
Dim Validate_ReturnValue As Integer
Dim Validate_ReturnMsg As Variant
Dim Validate_PersonId As Variant
Validate_PersonId = Start_CustomerId
Dim Validate_Pin As Variant
Validate_Pin = Start_Pin
Dim Validate_CheckingId As Variant
Dim Validate_SavingsId As Variant
'Call Service function
Validate_ReturnValue =
PxCustomer.Check(Validate_ReturnMsg,Validate_PersonId,Validate_
Pin,Validate_CheckingId,Validate_SavingsId)
'Create next step decisions
If Validate_ReturnValue < 0 Then Go To No_Account
If Validate_ReturnValue >= 0 Then Go To Account_Found
'End of stage
```

5.4 An "Exit" Stage:

In such a stage the dynamic map object returns to the caller.

There are a number of parts to the code:
- 5.4.1 The code generator writes the name of the stage (No_Account in the following example)
- 5.4.2 The code generator assigns a return value to the function.
- 5.4.3 The code generator assigns values to the return parameters.
- 5.4.4 A return takes place An example follows:

'An Exit Stage

```
'***********************************************
'Stage name
No_Account:
'Return Value
ATM_Validate_Customer = -1
'Parameters values assigned
Start_ReturnMsg = Validate_ReturnMsg
Start_CheckingId = -1
Start_SavingsId = -1
'Return to caller
Exit Function
'End of stage
```

In addition to the actual code the code generator generates project preambles as required by the language development system used.

What is claimed is:

1. A method for developing a software program for managing a business process, the method comprising:
   (a) providing a plurality of business server objects, each business server object containing a set of service functions and being associated with a database;
   (b) providing a plurality of client interfaces each client interface including a set of screens for collecting and displaying transaction data to support the conduct of transactions;
   (c) constructing a dynamic mapping between client interfaces, on the one hand, and business server objects, on the other hand, in order to implement a business transaction, the step of constructing including:
      (1) selecting a client interface;
      (2) selecting the transaction to be implemented using the selected client interface;
      (3) specifying a series of stages to implement the transaction to result in a dynamic map of the transaction, each stage having at least one of (i) a member service function of a business server object and (ii) an exit;
      (4) translating the dynamic map into code.

2. A method according to claim 1, wherein the step of specifying the series of stages includes for each stage, after a start stage, a formula, using predecessor stage parameters, to assign values to current stage parameters.

3. A method according to claim 2, wherein the step of specifying the formula includes displaying all parameters available at such stage, for possible inclusion in the formula.

4. A method according to claim 3, wherein the step of specifying the formula includes, for each parameter being displayed as available the steps of
   (a) accessing dimension types associated with such parameter; and
   (b) thereafter determining whether such parameter has a dimension type that is appropriate for the formula in the manner being specified.

5. A method according to claim 2, wherein step (a) includes characterizing each of the input and output parameters of each business server object by assigning attributes to based on the business significance of each such parameter.

6. A method according to claim 1, wherein the step of specifying the series of stages includes specifying conditions under which the stage will be performed.

7. A method according to claim 5, wherein the step of specifying conditions includes displaying all parameters available to such stage for use in specifying conditions.

8. A method for developing a software program for managing a business process, the method comprising:
- (a) providing a plurality of business server objects, each business server object containing a set of service functions and being associated with a database;
- (b) providing a plurality of client interfaces, each client interface including a set of screens for collecting and displaying transaction data to support the conduct of transactions;
- (c) constructing a dynamic mapping between client interfaces, on the one hand, and business server objects on the other hand, in order to implement a business transaction, the step of constructing including:
  - (1) selecting a client interface;
  - (2) selecting the transaction to be implemented using the selected client interface;
  - (3) specifying by graphic means a series of stages to implement the transaction to result in a dynamic map of the transaction;
  - (4) translating the dynamic map into code.

9. A method according to claim 8, wherein the step of specifying the series of steps includes specifying for each stage at least one of (i) a service function of a business server object and (ii) an exit.

10. A method according to claim 8, wherein the step of specifying the series of stages includes for each stage, after a start stage, specifying a formula, using predecessor stage parameters, to assign values to current stage parameters.

11. A method according to claim 10, wherein the step of specifying the formula includes displaying all parameters available at such stage, for possible inclusion in the formula.

12. A device for developing a software program for managing a business process, the device comprising:
- (a) first memory area for storing a plurality of business server objects, each business server object containing a set of service functions and being associated with a database;
- (b) second memory area for storing a plurality of client interfaces, each client interface including a set of screens for collecting and displaying transaction data to support the conduct of transactions;
- (c) arrangement for constructing a dynamic mapping between client interfaces, on the one hand, and business server objects, on the other hand, in order to implement a business transaction, the arrangement including:
  - (1) interface selection means for selecting a client interface;
  - (2) transaction selection means for selecting the transaction to be implemented using the selected client interface;
  - (3) stage specification means for specifying a series of stages to implement the transaction to result in a dynamic map of the transaction, each stage having a least one of (i) a member service function of a business server object and (ii) an exit; and
  - (4) code generator for translating the dynamic map into code.

13. A device according to claim 12, further comprising:
means for graphically displaying items associated with at least one of the business server objects and the client interfaces to provide a browsing capability to assist a user in development of the software system.

14. A device according to claim 12, wherein the stage specification means includes formula specifying means for specifying for each stage, after a start stage, a formula, using predecessor stage parameters to assign values to current stage parameters.

15. A device according to claim 14, wherein the formula specifying means includes means for displaying all parameters available at such stage for possible inclusion in the formula.

16. A device according to claim 14, wherein the first memory area includes means for storing attributes, for characterizing each of the input and output parameters of each business server object, such attributes based on the business significance of each such parameter.

* * * * *